(12) United States Patent
Schwartz

(10) Patent No.: US 8,058,542 B2
(45) Date of Patent: Nov. 15, 2011

(54) CHORD PROGRESSION BASED TECHNIQUES AND TOOLS FOR LEARNING TO PLAY MUSIC

(76) Inventor: Richard Andrew Schwartz, Mandeville, LA (US)

( * ) Notice: Subject to any disclaimer, the term of this patent is extended or adjusted under 35 U.S.C. 154(b) by 957 days.

(21) Appl. No.: 11/506,642

(22) Filed: Aug. 18, 2006

(65) Prior Publication Data

US 2007/0039447 A1 Feb. 22, 2007

Related U.S. Application Data

(60) Provisional application No. 60/709,840, filed on Aug. 19, 2005.

(51) Int. Cl.
*G09B 15/00* (2006.01)
(52) U.S. Cl. .................................. 84/470 R
(58) Field of Classification Search ............... 84/470 R, 84/471 R, 478, 479 R, 483.1, 483.2, 484, 84/485 R
See application file for complete search history.

(56) References Cited

U.S. PATENT DOCUMENTS

| | | | |
|---|---|---|---|
| 6,288,315 B1 * | 9/2001 | Bennett | 84/470 R |
| 7,465,868 B2 * | 12/2008 | Lengeling | 84/719 |
| 2008/0087160 A1 * | 4/2008 | Gabert | 84/478 |

OTHER PUBLICATIONS

Theory Notebook, Hanson House 1968, Chas Hansen.*
Aebersold, Jamey, "How to Play Jazz and Improvise", New Albany, NY: Jamey Aebersold, © 1979, pp. 49-50, 53, 60 and 62.
Baker, David, "Jazz Improvisation", Van Nuys, CA: Alfred Publishing Co., Inc. © 1988, pp. 4-5 and 7.
Coker, Jerry, et al., "Patterns for Jazz", Studio P/R, Inc. © 1970, pp. 16-20, 75, 83, 85-87 and 94.
Hough, Roy, "Exerciser for the Study of Improvisation", Self-published 1987.
Klosé, Hyacinthe, "25 Daily Exercises for Saxophone", New York, NY: Carl Fisher, Inc. © 1943.
Kynaston, Trent, "Jazz Improvisation", Englewood Cliffs, NJ: Prentice-Hall, Inc. © 1978.
Ligon, Bert, "ii-V7-I Outlines: Concepts in Connecting Chords with Linear Harmony", Handout for the 1993 International Association of Jazz Educators Convention, San Antonio, TX.
Reeves, Scott D. "Creative Jazz Improvisation", Upper Saddle River, NJ: Prentice Hall, Inc. © 1995, p. 3.
Ricker, Ramon, "Advanced Chord Etudes for Saxophone", Alphonse LeDuc et Cie © 1992.
Ricker, Ramon, "New Concepts in Linear Improvisation", Miami, FL: CPP/Belwin, Inc., © 1977, pp. Introduction, 1, 3-4, 7 and 14-17.

(Continued)

*Primary Examiner* — Kimberly Lockett
(74) *Attorney, Agent, or Firm* — Gordou E. Nelson

(57) ABSTRACT

Techniques for gaining facility in the performance of jazz music by performing a sequence of patterns. Each pattern begins at a fixed interval from the preceding pattern in the sequence and the patterns are performed with perpetual motion between the patterns. The patterns are all performed with the same articulation and are systematically performed across the complete range of the instrument and across a complete set of key areas and modes. In an exemplary embodiment, the patterns are made up of eighth note octave scales played in four four time with notes played on the upbeat being slurred to notes played on the downbeat. The last note of one pattern is slurred to the first note of the next. In the exemplary embodiment, the sequences of patterns are performed in all keys and the scales are drawn from the major scale and modes that stem from the major scale.

23 Claims, 7 Drawing Sheets

OTHER PUBLICATIONS

Ricker, Ramon, "Twelve Challenging Etudes for Saxophone", Alphonse LeDuc et Cie © 1992.

Viola, Joseph, "The Technique of the Saxophone, vols. 1 and 2", Boston, MA: Berklee Press Publications © 1965, p. 56.

* cited by examiner

CHORD PROGRESSION BASED TECHNIQUES AND TOOLS FOR LEARNING TO PLAY MUSIC

CROSS-REFERENCE TO RELATED APPLICATIONS

This application claims priority from U.S. provisional patent application 60/709,840, Richard Andrew Schwartz, Chord progression-based techniques and tools for learning to play music, filed Aug. 19, 2005. That application is incorporated by reference in its entirety into the present patent application.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the invention

The invention relates generally to techniques for gaining facility in the playing of musical instruments and more specifically to techniques for gaining facility in making transitions from a key or mode to another key or mode.

2. Description of related art

Since at least the time of Bach's *Well-tempered Clavier*, classically-trained musicians have used systematically-constructed sets of exercises to gain proficiency in singing or playing their instruments. One of the kinds of proficiency taught in these exercises was improvisation within the context of classical music. For example, the famous piano virtuoso and etude writer Carl Czerny's Opus 200 (1836) is a set of etudes entitled *A systematic introduction to improvisation on the pianoforte*. The title of Czerny's work expresses the underlying paradox: improvisation, that seemingly most spontaneous form of musical expression, requires careful and systematic preparation on the part of the musician. As Czerny put it, "When the practicing musician possesses the capability not only of executing at his instrument the ideas that his inventive power, inspiration, or mood have evoked in him at the instant of their conception but of so combining them that the coherence can have the effect on the listener of an actual composition-this is what is called: Improvising or Extemporizing."

While improvisation in the context of classical music is of at most historical interest, jazz improvisation is a living art. Jazz was originally an aural tradition, and improvisation was learned by listening to jam sessions and participating in them. As jazz has grown more complex and traveling big bands and their jam sessions have disappeared, people have begun to teach improvisation in schools. With that has come a large and confusing literature devoted to teaching improvisation.

Jazz improvisation is the spontaneous creation of music in the jazz style. Like traditional composition, jazz improvisation is a craft. It is a conditioning of the mind, body and spirit, brought about by the study of musical principles. This conditioning becomes a necessary prelude to the professional practice of the art, despite the implications of the word spontaneous. Just as spontaneity is combined with conditioning, so is the existing style of jazz combined with original of expression. One is lost without the other, and so we seldom hear an improviser's solo that do not contain melodic fragments or patterns: from the melody of the tune used, from a fellow performer's solo, from an influential player of the time, from a different tune altogether, from material previously improvised, or from patterns (original and borrowed) currently studied in individual practice. Another obvious combination is creation and performance. The jazz improviser pre-hears in his mind the next musical event, and then has the added task of playing it cleanly and with feeling. This is the process of jazz improvisation.

The study of jazz improvisation may be separated into three main areas of study. These areas are: facility, linguistics, and interaction.

Facility includes any act which helps the player to gain control of his or her instrument and/or any act contributing to the reading and comprehension of musical information. In regards to the alto saxophone gaining control of the instrument includes but is not limited to coordination between the fingers and tongue, embouchure development, air support, posture, reading notes, chord symbols, articulations, rhythms, dynamics, etc . . . In order to overcome limited facility on one's instrument one may practice long tones, scales, arpeggios, interval patterns, melodic phrases, and other devices. In order to develop better reading and comprehension of musical information, one may study musical notation privately or with a teacher.

One must become as proficient as possible on his or her instrument. Any musician is inhibited and limited by the lack of knowledge of the instrument. Musicians who know their instruments we have a better chance of conveying the music that is contained within their mind to the listener. The finest, most successful and well established jazz players not only continue to practice their instruments to maintain technical facility but also are consistently seeking to improve jazz vocabulary.

Like languages with regional accents, jargon, slang terms, and phrases, most music including jazz tends to have its own idiomatic phrases. To exercise jazz linguistics, one may engage in several activities. These include, but are not limited to, repeatedly listening to a multitude of jazz recordings, singing along with jazz recordings or others, transcribing jazz melodies and improvised solos, and practicing idiomatic phrases or patterns found in jazz solos or elsewhere. The most important way to learn the linguistics of jazz is listening to jazz. Virtually every great jazz player has learned the art form in the same manner: through learning the solos of other great players.

When listening to great jazz artists, students may find a particular sequence of notes enjoyable and transfer this melodic pattern of notes to his or her instrument. The idea of learning a pattern and when to play it should not be thought of as uncreative. Because it is impossible to continuously create new meaningful ideas, improvisers at times resort to playing ideas or patterns that have been practiced and mentally logged before hand. This is taking nothing away from the improvised because it is often just as hard to play an idea several times in a row, each time with the same conviction, as it is to create completely new ideas.

The frequent mention of melodic fragments, patterns, and sequences of notes in the foregoing discussion suggests the need for a collection of patterns to be practiced diligently by the serious student of jazz improvisation. After the student has acquired some basic vocabulary, has a good sound, and knows how to properly articulate and inflect, learning to organize (or reorganize) material is the next logical step to master.

Because jazz is multifaceted, interaction, leading to good communication, in performance with other musicians is vital. Jazz is a complex art form combining the talents of individuals together as a collective whole. Therefore the art of improvisation must be taught both individually and collectively. In this fashion ideas may be shared aurally and developed. As essential to students as technical information and counsel is the understanding of jazz acquired directly through performance.

Facility, linguistics, and interaction work collectively to develop a strong sense of comfort in the jazz idiom and jazz improvisation. Many times these defined areas in fact overlap. One such case is the transcribing of a melodic phrase, or "lick," from a solo and practicing it in all keys. Here, both facility and linguistics are used. Facility is employed due to the practice of tongue and finger coordination. Linguistics is utilized due to the practice of phrasing the melodic figure just as one had heard it on the jazz recording.

Another such case of overlapping is partaking in a jam session. Here, interaction is exercised, for the wonderful interplay between jazz musicians. Also, linguistics is implemented due to the "conversation" flowing back and forth between jazz musicians. Again, facility, linguistics, and interaction operate together to develop a strong sense of ease in the performance of jazz improvisation.

In *New Concepts in Linear Improvisation*, Miami, Fla. CPP/Belwin, Inc., 1976, Ramon Ricker discusses three distinct categories of jazz improvisers: the "head" player, the "ear" player, and the "ideal" player. Each is described. Most important is an explanation of how each type of improviser would improvise.

Ricker describes a "head" player as one who has a good intellectual grasp of improvisation, but whose solos never seem to work. Instead, they seem to lack the emotion or musical sense to make things happen.

An "ear" player is said to be a student who frequently will have no idea of what he is playing, but the performed solos will sound passable. The performer will sound good on blues and other simple chord progressions, but when more difficult tunes are encountered, fails hopelessly.

Ricker describes the "ideal" player as one who has the theoretical knowledge, but doesn't let it get in the way of his or her music. He states, "The marriage of intellect and emotion is a difficult one to consummate, but nevertheless quite possible." Fundamental to becoming an ideal player is that the player must be able to hear an interesting improvisation in his or her head and then be able to immediately play what he or she has heard on his or her instrument. In order to become an ideal player, a student must have an education in improvisation that balances technique and ear. It is an object of the techniques disclosed herein to provide such an education.

BRIEF SUMMARY OF THE INVENTION

The object is achieved by performing a set of exercises. Each exercise is made up primarily of a sequence of patterns. Each pattern begins at an interval from the beginning of the preceding pattern in the sequence that is the same throughout the sequence and the patterns are performed with perpetual motion between the patterns.

In one species of the invention, the patterns are octave scales that have notes of equal duration. The interval for the sequence may be selected from intervals ranging from the half step through the tri tone. The sequence of the patterns may span a predetermined range, with the first pattern of the sequence being at one end of the range and the patterns of the sequence extending to the other end of the range and back to the beginning of the range. The octave patterns may be ascending, descending, or include both ascending and descending patterns. In the patterns that include both ascending and descending patterns, the ascending and descending octaves of the pattern are different by an interval that is half the size of the interval between the patterns. Each octave scale may be played in a single measure in four four time.

Each pattern is articulated in the same fashion. An advantageous mode of articulation is to play the first note of the first pattern in the sequence legato and after that to play the first note of each octave on the downbeat. The following notes of the pattern are played alternatively on the upbeat and the downbeat. The notes of the pattern that are played on the upbeat are slurred to the notes that are played on the downbeat and the last note of each pattern is slurred to the first note of the next pattern. The sequences of patterns include sequences in which the pattern extends over two octaves.

In one species of the exercises, the sequence of patterns is performed in many keys and the patterns for a key are drawn from the major scale for the key and modes that stem from the major scale. In another species, each pattern of the sequence is performed in one of a sequence of keys. The fundamental of each key in the sequence differs from the fundamental of the previous key by an interval which is the same throughout the sequence. The interval may range from the half step through the tri tone.

Other objects and advantages will be apparent to those skilled in the arts to which the invention pertains upon perusal of the following Detailed Description and drawing, wherein:

BRIEF DESCRIPTION OF THE SEVERAL
VIEWS OF THE DRAWINGS

Figure 1:
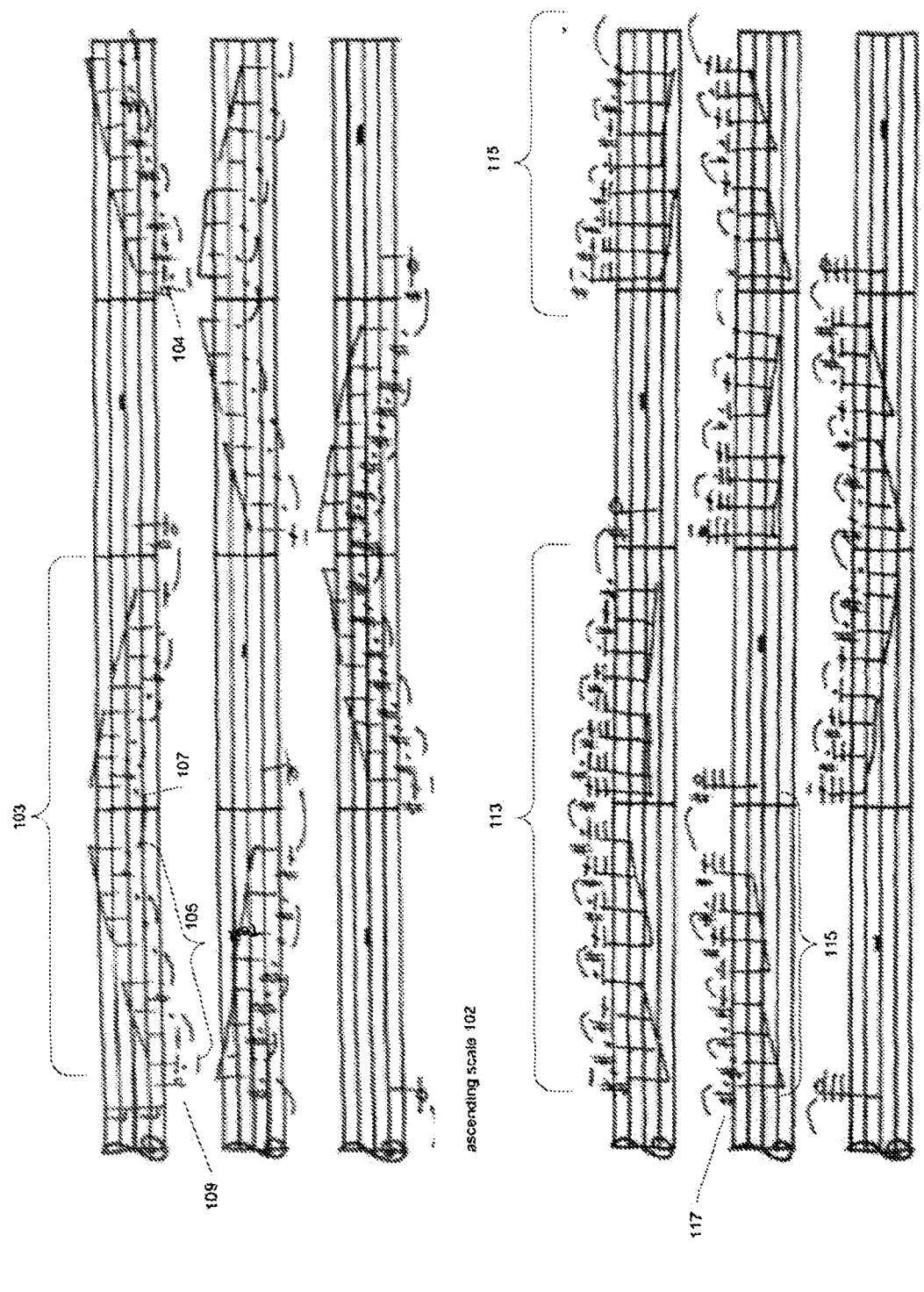
FIG. 1 is a first example of a preparatory exercise of the method.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION OF THE INVENTION

Overview of the Technique
Underlying Musical Principles

Jazz instruments fall into two broad classes: instruments which can play a single line of music and instruments which can play chords. The inventor is a saxophone player, and consequently, the preferred embodiment described in the following is for saxophone. The principles of the preferred embodiment may be applied directly to any other instrument which can perform a single line of music, including the human voice, and may also be applied to instruments upon which chords can be played.

Up to the Bebop era, jazz improvisation was based strongly on chord harmonies. Arpeggio-like figures were common. This is what many in jazz call vertical improvisation, inside playing, or vertical approach. Coleman Hawkins and Rex Stewart were seen as musicians who used this approach due to the influence of Louis Armstrong, Bix Beiderbecke, and others. Vertical improvisation, or chordal playing, can be achieved on the saxophone by creating the illusion of playing chords. This effect is acquired on a single line instrument by using arpeggios. This may be the reason why many teachers of improvisation believe that improvisation study should begin with arpeggios. From the Bebop era and on, scalar patterns and melodic contours become routine in jazz improvisations. Many call this approach "horizontal," or linear, improvisation. What is in fact meant by linear improvisation is scalar or modal improvisation. Since the saxophone is a single line instrument, scalar or modal improvisation is the most accessible form of improvisation.

The basis of scalar improvisation is scales. In conventional Western music, all scales are patterns made up almost entirely of half steps and whole steps, with the half step defined as the smallest possible distance between two notes. A half step can also be defined as a semitone. A whole step is equivalent to two half steps. The major scale is constructed from the following step pattern: whole, whole, half, whole, whole, whole, half. This pattern can be moved, or transposed, to start any on note.

Using Scales to Prepare for Jazz Improvisation

In a preferred embodiment, the exercises used to prepare the student for improvisation are based on sequences of scales. The manner in which the scales should be practiced when they are used to prepare the student for improvisation is shown at 101 in FIG. 1, which shows parts of a preliminary exercise in a preferred embodiment of the technique disclosed herein. The scales in the preliminary exercise are played in one octave patterns ascending and descending in consistent eighth notes, as shown at 103, with each new pattern beginning a half tone higher than the preceding pattern and employing the major scale that begins on that note, as shown at 104. The patterns are thus a chromatically ascending sequence of scales. The patterns start with the lowest note that is comfortably playable on the instrument and end with the highest. In order for such a pattern to end rhythmically on beat one with consistent eighth notes in common, or four-four, time, an eighth note must be added, as shown at 107. The added note is a repetition of the seventh scale degree as the added note. That note has been chosen to keep the scale pattern within a one octave range and have it end on beat one. If the scale were to be practiced with a sequence larger than an octave, then the sequence of notes at the top of the instrument would have to be compromised. For instance, the highest written note in the range of the alto saxophone is a written F sharp. If one were to construct major scale exercises up to the ninth, the highest major scale one could practice on the alto saxophone is E major. F sharp is the ninth scale degree in E major. If the scale to be practiced is one octave in length, the practitioner would be able to facilitate not only the E major scale, but also F major and F sharp major.

The one octave scale pattern should not only be practiced ascending leading to descending, but descending leading to ascending. This is shown at 111. The pattern begins with the highest note that is comfortably playable on the instrument. In scale exercises with descending motion first, there is also a repeated eighth note 117. This eighth note is the second scale degree, or "re" in solfeggio terms. In the second half of Preliminary Exercise #1, each statement of the pattern is one half-step lower than the previous. The exercise is a chromatically descending sequence of scales, all having the same pattern. The major scales of the exercise are to be practiced over the full range of the instrument. While ascending harmonically, these scales are played ascending and descending. Then while descending harmonically, these scales are played descending and ascending. The chromatic sequence of scales is chosen simply because it guarantees that the player will play all of the major scales across the complete range of the instrument.

An important characteristic of these scale patterns is the articulation pattern employed in them. It is the same in all of the patterns as is shown at 105. The first eighth note of the pattern is be played legato; the remaining eighth notes in the pattern are to be articulated when the eighth note is played on the upbeat and slurred to the eighth note played on the downbeat.

A characteristic which the scales 101 of preliminary exercise 1 have in common with those generally used in exercise books is that the exercise gives the player time to contemplate the next scale after he or she has finished playing the last scale. As shown, each pattern ends on a half note with a two beat rest filling out the measure. Scales practiced in this manner do not help the jazz musician to improvise musical lines that run seamlessly across harmonic transitions. To prepare the player for such transitions, the next set of preliminary exercises moves directly from the last note of the preceding scale pattern to the first note of the next scale pattern, which of course is in a different key. This is shown in FIG. 2. Four of the scale patterns in the next preliminary exercise are shown at 201. Each of these patterns is like pattern 103 in FIG. 1, and as shown there, each pattern begins ½ step higher than the preceding pattern. However, the patterns no longer end with a half note on the fundamentals of their scales followed by a rest. Instead, the player moves directly from the "re" of pattern 205 to the fundamental 207 of pattern 205, which, however, is only ½ step lower than the "re", rather than the expected full step for the fundamental of pattern 203. The effect of this seamless motion from pattern 203 to pattern 205 is heightened by the fact that the player slurs down to the first note of pattern 205 in exactly the same way that he or she slurs to the notes of pattern 203 that are on the downbeat. Thus, the only note in the sequence of patterns shown in FIG. 2 that is played legato is the first note of the first pattern in the sequence. This kind of seamless motion between patterns appears in classical music in Paginini's *Perpetual Motion*. In the following, the seamless motion between patterns typified by the sequence of patterns shown in FIG. 2 will be termed perpetual motion.

Exercises for Gaining Facility in Crossing Harmonic Lines

Species of Scale Patterns Used in the Exercises

Figure 3:
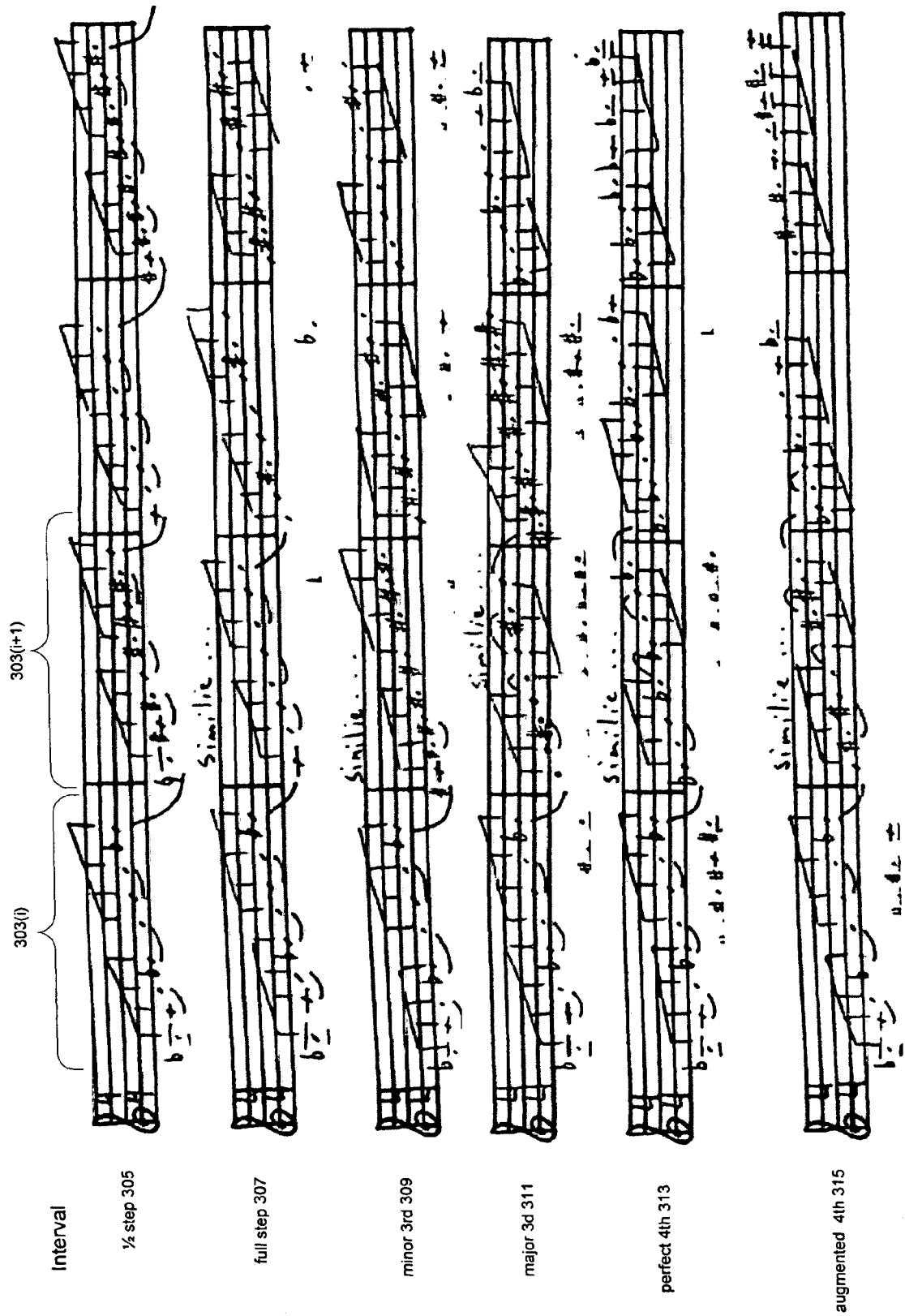
FIG. 3 shows a first species of the patterns used in the method together with the intervals used in the method.

In the exercises of the training technique proper, four species of scale patterns are employed, one for each exercise, and within an exercise, one of six intervals, ranging from ½ step through the tri-tone (diminished 5th or augmented 4th) separates the note that begins the current pattern from the note that begins the next pattern. The motion from scale pattern to the next is perpetual. FIG. 3 shows at 301 the first species of scale pattern and examples of each of the intervals. The pattern for the first species is shown at 303; it is an ascending octave scale made up of eighth notes in a 4/4 measure. In the next measure, the pattern begins at a note which is a predetermined interval higher; the previously-described articulation is employed and the player slurs from the last note of the current pattern to the first note of the next pattern. The pattern is played in ascending order of the scales from bottom to top of the instruments' range; then it is played in descending order of the scales from top to bottom of the instrument's range. The player plays the entire exercise for each of the intervals. The interval between the beginning note for a pattern 303(*i*) and a successive pattern 303(*i*+1) ranges from ½ step through the augmented 4th, as shown at 305 through 315 in FIG. 3. Intervals larger than the augmented fourth are redundant, since they are equivalent to intervals smaller than the augmented 4th in the next octave.

Figure 4:
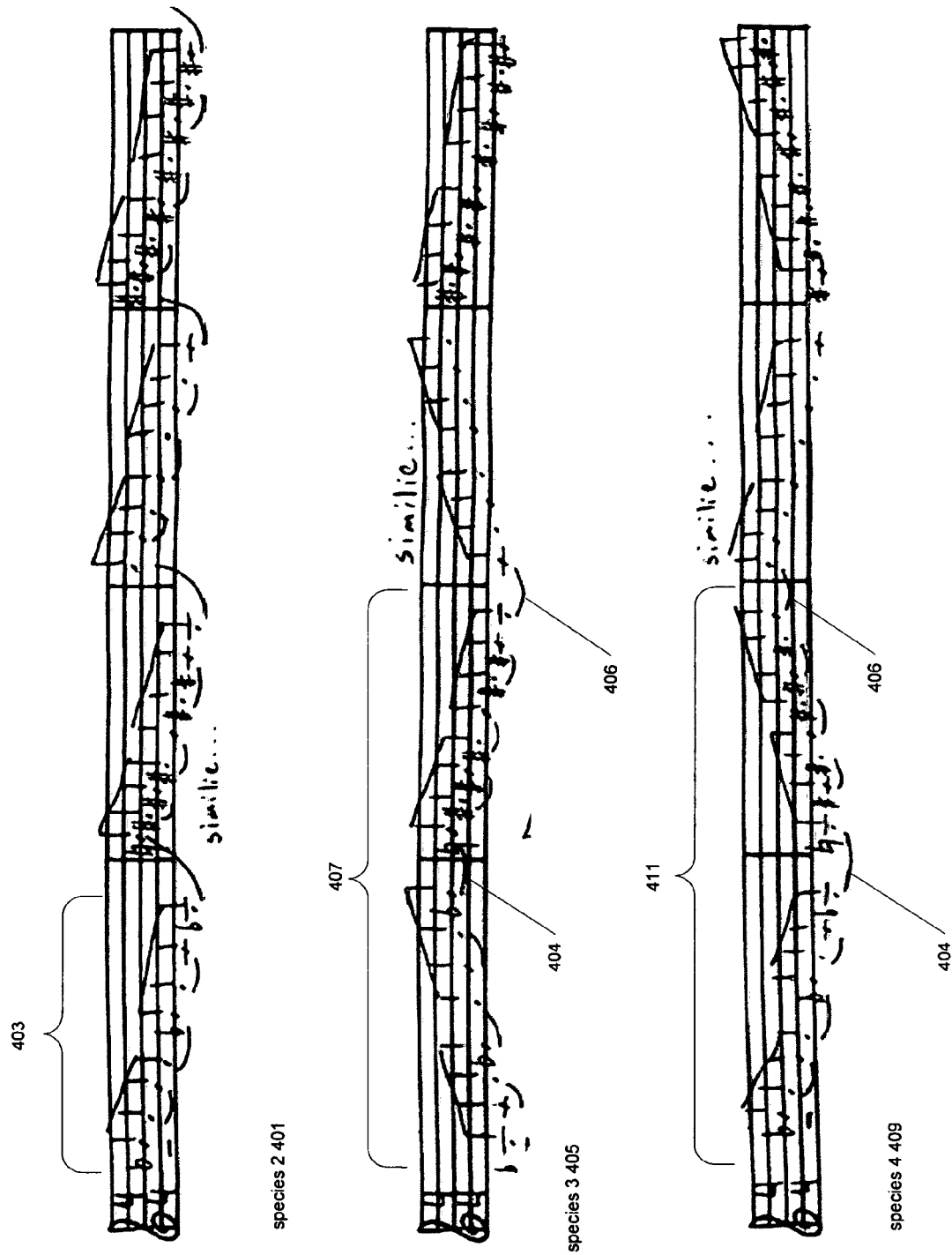
FIG. 4 shows three other species of the patterns used in the method.

FIG. 4 shows the remaining three species, each with a ½ step interval between the patterns. Species 2 is shown at 401. Pattern 403 for the second species in the first half of exercises using the pattern is a descending one octave major scale. The scale begins an octave above the lowest note of the instrument and, like species one, is sequenced by a given interval in ascending fashion. The second half of the second species employs the same scales as the first half, but these scales follow through a descending sequence. The interval for each of these sequences is the same as for the ascending half of the exercise; articulations throughout are as shown at 109 in FIG. 1.

Species 3 is shown at 405. The first half of an exercise using the third species employs a two measure pattern 407: the first measure contains an ascending major scale pattern and the second measure contains a descending major scale pattern up a given interval. This interval appears in FIG. 4 as interval X 404. The next two measure pattern 407 in the sequence is higher by a second given interval. This interval appears in FIG. 4 as interval Y 406. Interval Y 406 is twice the size of interval X 404. In the half step exercise shown, interval X 404 is a half step and interval Y 406 is a whole step. Other such exercises may of course employ different values for interval X and interval Y, but the ratio between interval X and Y remains the same. The first half of the exercise begins at the bottom of the instrument's range and extends to the top of the range. The second half of an exercise using the third species begins an octave below the highest note on the instrument and also employs a two measure pattern: the first measure contains an ascending major scale pattern and the second measure contains a descending major scale pattern down by interval 404. The next repetition of the two measure pattern is down by interval 406. The second half of the exercise begins at the top of the instrument's range and extends to the bottom. Articulations in both halves are as shown at 109 in FIG. 1.

Species 4 is shown at 409. The first half of an exercise using the fourth species employs a two measure pattern 411: the first measure contains a descending major scale pattern and the second measure contains an ascending major scale pattern up a given interval. This interval appears in FIG. 4 as interval X 404. The next two measure pattern 411 is higher by another given interval. This interval appears as interval Y 406. Interval Y 406 is twice the size of interval X 404 for all values of interval X. The first half of the exercise begins at the bottom of the instrument's range and extends to the top of the range. The second half of an exercise using the fourth species also employs a two measure pattern: the first measure contains a descending major scale pattern and the second measure contains an ascending major scale pattern down by interval 404. The next repetition of the two measure pattern is down by interval 406. Articulations in both halves are as shown at 109 in FIG. 1. Experience has shown that the order of difficulty of the species is 1 through 4. Students are generally more comfortable with exercises in which the set of scales is played in ascending order and the key is kept consistent. It is also easier for them to deal with the harmonic transition from a pattern to a following pattern if the pattern they are playing consists only of ascending scales.

Figure 2:
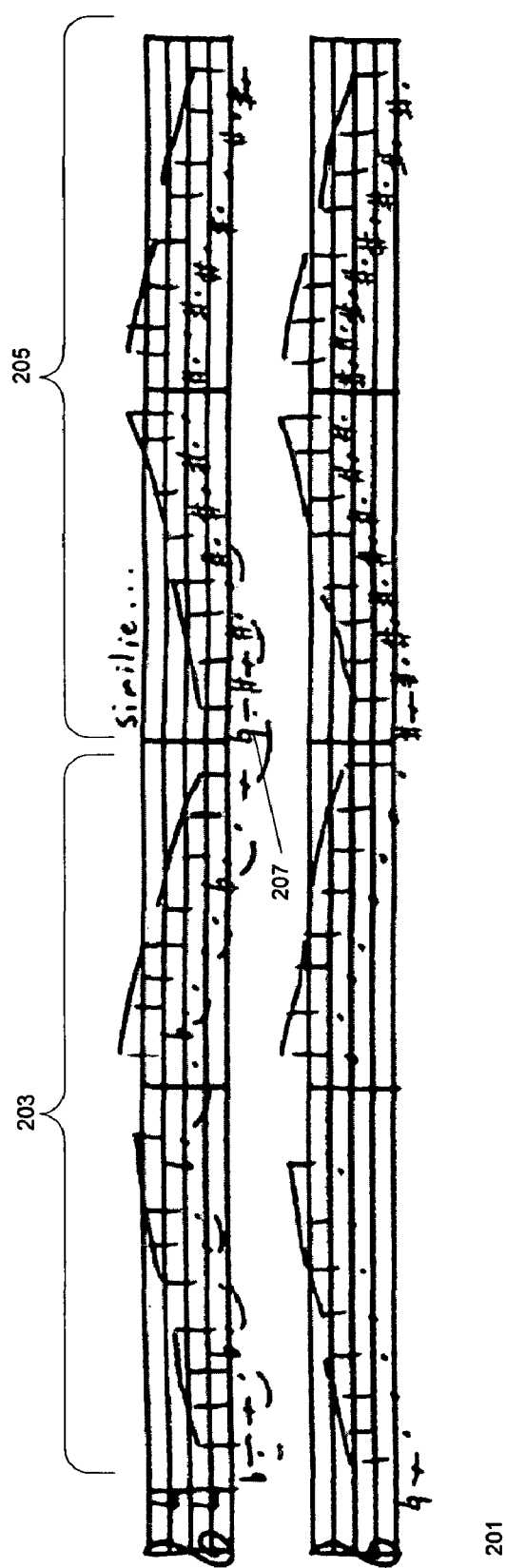
FIG. 2 is a second example of a preparatory exercise of the method.
Figure 5:
FIG. 5 shows a portion of an exercise that employs a two-octave version of the first species.
Figure 6:
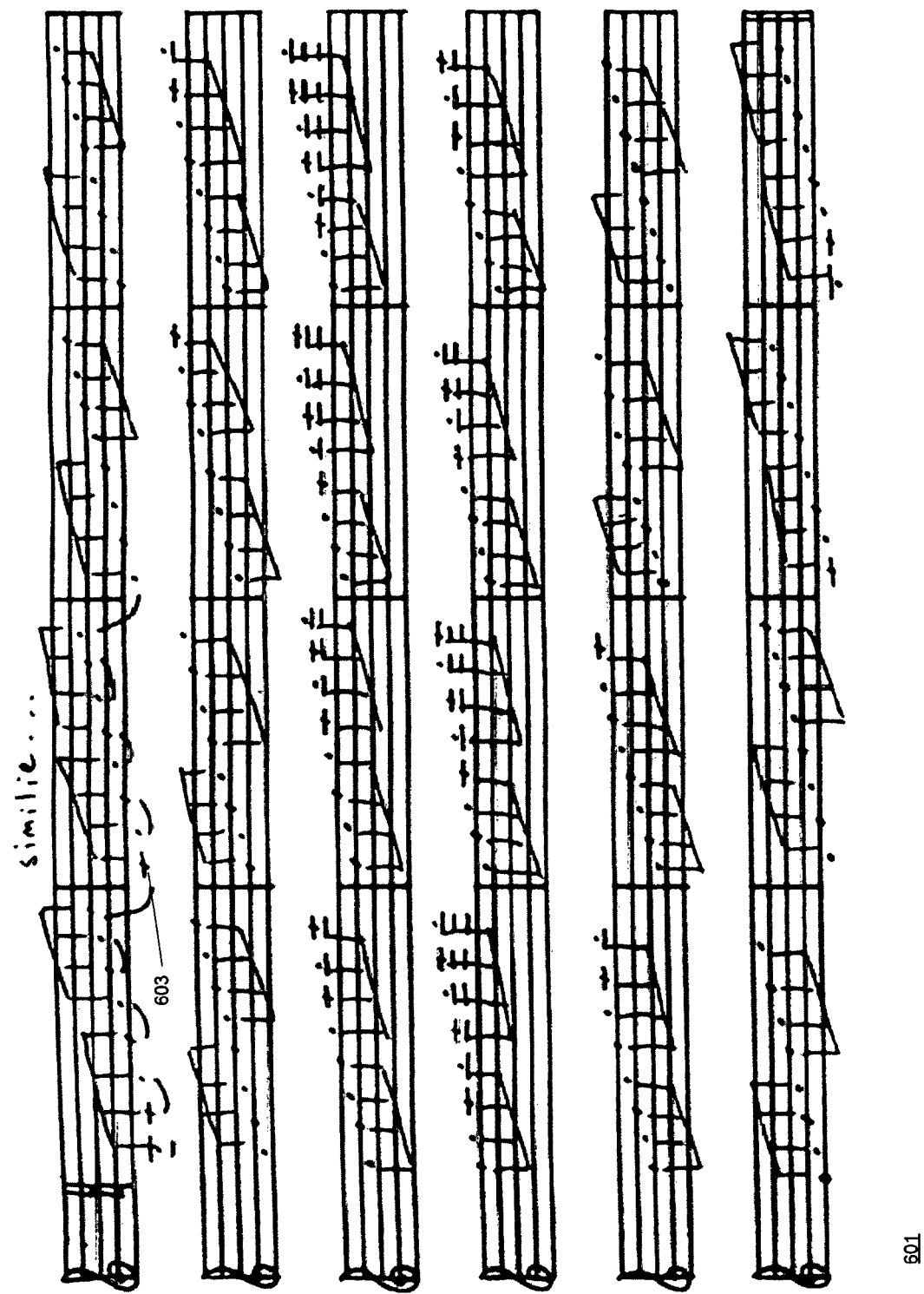
FIG. 6 shows an exercise in the key of C from the exercises in major and its modes.
Figure 7:
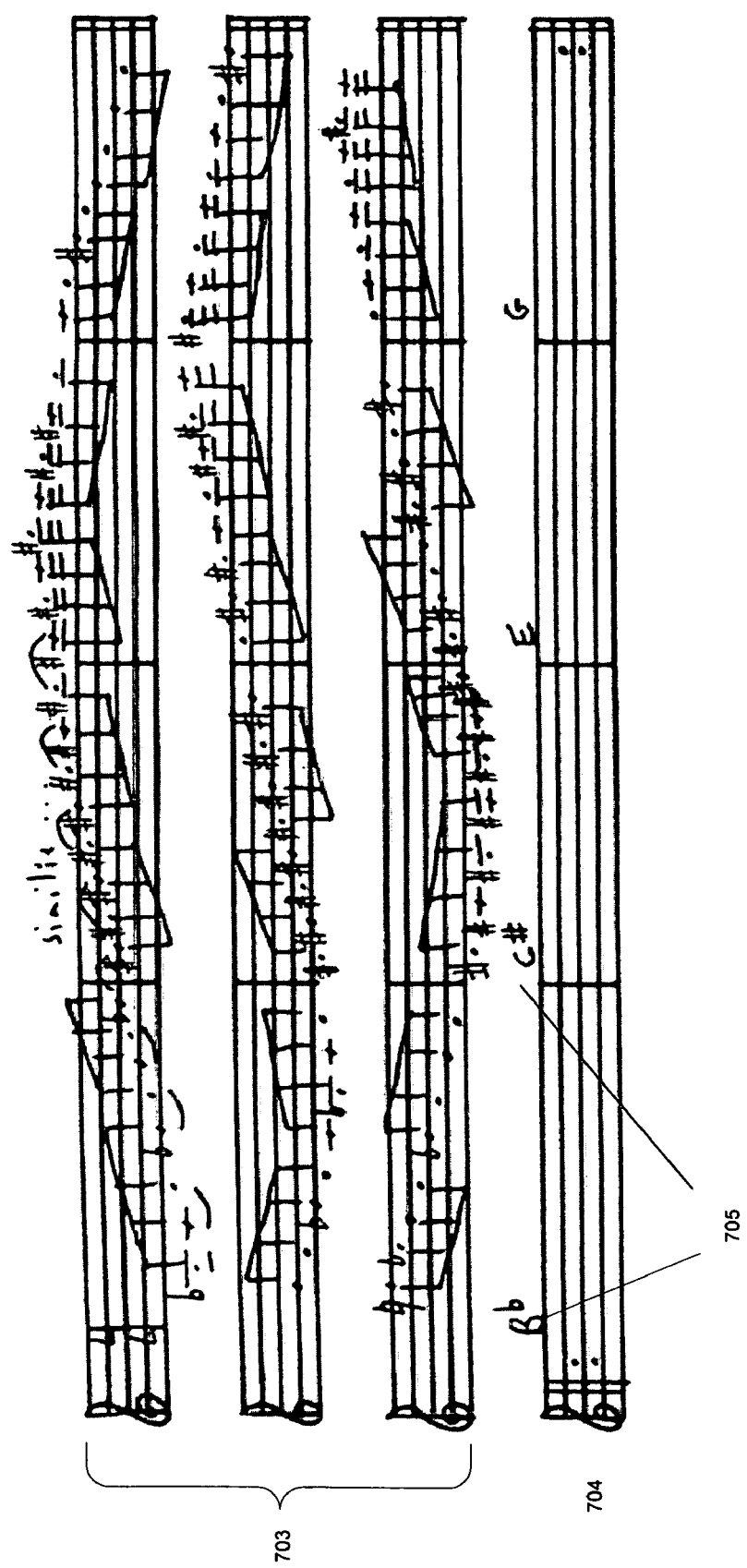
FIG. 7 shows an exercise from the final exercises.

A Method of Gaining Facility in Playing Instruments of the Type that Play a Single Line of Music The four species just set forth are the foundations of a complete method of gaining facility in playing instruments that play a single line of music. All of the exercises use the articulation shown at 109 in FIG. 1. The method includes the following exercises:

- The preliminary exercises of FIGS. 1 and 2;
- The single octave exercises shown in FIGS. 3 and 4, in which patterns belonging to all four species are used to play all major scales, with the next pattern in a given exercise beginning at a constant interval from the previous pattern. The interval for the exercise may be a half tone, a whole tone, and so on through the augmented fourth.
- Two-octave exercises that work like those in FIGS. 3 and 4. FIG. 5 shows an example exercise in which the species is a two-octave version of species 1.
- Exercises for each species in each key area. A key's key area includes the key's major scale and all of its modes. In all of these exercises, the interval for the next pattern is the next diatonic note in the major scale of the key of the exercise. FIG. 6 shows an example in the key of C.
- For the final set of exercises, the key signature changes every measure and the sets of scales of the exercise begin on the lowest note in the instrument's range, ascend to the highest note, and descend again to the lowest. The mode of a given pattern is determined by the interaction between the key signature and the starting note of the pattern. There is a set of these exercises for each interval from the half tone through the augmented 4th. FIG. 7 shows an example of these exercises.

The above method encompasses all major scales, descending and ascending, in all harmonic possibilities on the alto saxophone. The use of the four species and of an interval for each exercise that may range from the half tone through the augmented fourth ensure that the player gains experience in all harmonic possibilities in the major key. While not essential to the method, the order of the species from 1 to 4 has been tested and has been found to be valuable, as has the order of harmonic progressions.

Further Details of the Method

The Two-Octave Exercises: FIG. 5

One of these exercises is shown in its entirety at 501 in FIG. 5. The exercise is in the key of C. It employs a two-octave version 503 of pattern 1 which takes up two measures. Pattern 503 has a first octave scale 505 and a second octave scale 507. Because the pattern is pattern 1, both are ascending. Interval 509 between first octave scale 505 and second octave scale 507 has a value X; here it is a half step. Interval 511 between the start of the last pattern 503 and the start of the next pattern 503 has a value Y which is twice value X. Thus, in exercise 501, the interval is a whole step. The ratio between interval X and interval Y remains the same for all values of interval X. As with the species, the values of interval X range from a half step through the augmented 4th.

There are similar exercises for two-octave versions of the other species. In the two-octave species 2, the pattern is a first octave scale followed by a second octave scale. The second octave scale begins at an interval X lower than the last note of the first octave scale. The next two-octave pattern begins at an interval Y=2X lower than the preceding two-octave pattern. The same interval X is used throughout a given exercise.

The two-measure octave ascending and descending patterns of species 3 and 4 become four-measure patterns where the ascending and descending scales are two octaves long. Each octave scale of the pattern is higher or lower by an interval X than the preceding octave scale of the pattern and each four-measure pattern is higher or lower by an interval Y=4X than the preceding four measure pattern. Interval X differs for each exercise and ranges from the half tone through the diminished 4th.

The Exercises in Each Key Area: The Major Scale and its Modes: FIG. 6

These exercises adapt exercises for practicing modes found in Ramon Ricker's *New concepts in linear improvisation*, cited above, to the general techniques employed in the method disclosed herein. Like the exercises already presented, these exercises utilize four established species. Please note that species three and four have been slightly altered. This was done to keep the direction of the scales consistent, whether ascending or descending.

- Species One Ascending one octave scales that harmonically ascend by diatonic intervals to the top of the instrument. After top of instrument has been reached, ascending one octave scales that harmonically descend by diatonic intervals.
- Species Two Descending one octave scales that harmonically ascend by diatonic intervals to the top of the instrument. After top of instrument has been reached, descending one octave scales that harmonically descend by diatonic intervals.
- Species Three Ascending to descending one octave scales that harmonically ascend by diatonic intervals to the top of the instrument. After top of instrument has been reached, descending to ascending one octave scales that harmonically descend by diatonic intervals.
- Species Four Descending to ascending one octave scales that harmonically ascend by diatonic intervals to the top of the instrument. After top of instrument has been reached, ascending to descending one octave scales that harmonically descend by diatonic intervals.

When a particular scale is introduced in a particular register of the saxophone it consistently appears in the same direction until the end of the exercise. In a given key, the next sequence of scales begins on the next diatonic note of the key. As regards of the order in which the keys are to be introduced, since written B flat is the lowest note on the alto saxophone, this series of exercises will begin on B flat. It is of no consequence which key area is presented first or even which order the series of exercises are practiced. Because it may be easiest for users to remember what key they are practicing, this set of exercises in the preferred embodiment progresses by half steps: the first exercise is in B flat, the second in B, the third in C, and so on.

FIG. 6 shows a portion of an exercise in the key of C for the first species. The first ascending scale begins at the lowest note in the key of C for the alto saxophone, namely B. The next ascending scale begins at the next diatonic note of the key of C, as shown at 603, and the pattern continues until the highest note in the key in the instrument's range is reached. The next ascending scale then begins at the next lower diatonic note of the key of C, and the pattern continues until the lowest note in the key of C is again reached.

The Final Exercises: FIG. 7

This set of exercises is intended to liberate an improviser from having to worry about harmonic changes or the constraints imposed by his or her instrument and allow him or her to focus on melodic content. The final set of exercises utilizes the facility gained from all of the previous sets of exercises. The final set of exercises employs:

- The entire range of the saxophone.
- A harmonic progression that either ascends or descends by a given interval.
- One octave scales of major or modal quality
- perpetual motion between the scales.
- Continued direction of the previous scale into the new. The scale direction only changes at the extremes of the instrument.
- Articulations as described previously: The first eighth note of the first pattern in the first sequence of patterns is to be played legato; the remaining eighth notes in the pattern are to be articulated when the eighth note is played on the upbeat and slurred to the eighth note played on the downbeat.
- Chord symbols to inform the user which key area the scale stems from.

In each of the final exercises, a scale pattern is written as it appears in at least one of a sequence of keys. The exercise then specifies the sequence of keys and the player plays the scale pattern for each of the keys in the sequence. Each of the keys in the sequence is specified by its major chord symbol. In the sequence for each exercise, the fundamentals of the keys in the sequence are separated by a given interval; as before, the intervals range from the half step through the tri tone. The player is thus comfortably introduced to reading chord symbols. The user has knowledge of all major scales and all modes stemming from theses major scales. Two innovations in these final exercises are the perpetual motion from the scale pattern in one key in the sequence to the scale pattern in the next key of the sequence and the requirement that the player read the major chord symbols.

FIG. 7 shows an example at 701 of these exercises. The scale pattern used in the exercise is shown at 703 and the sequence of keys at 704; as shown at 705, in this case, the interval between the fundamentals of the keys in the sequence is an augmented second or, enharmonically spelled, a minor third.

Innovations in the Method

Innovations in the method include:

- The entire range of the instrument is employed.
- Harmonic progressions ascend or descend by a given interval.
- One octave scales of major or modal quality are used through most of the method. Only one octave is used in order to have the harmonic rhythm move consistently every measure.
- Only eighth notes are used. There is perpetual motion between scales.
- The last set of exercises uses a continued direction of the previous scale into the new. The scale direction only changes at the extremes of the instrument. This helps the user construct longer, more mature, phrases in his or her improvisations.
- Consistent articulations, as employed by jazz artists and pedagogues, are utilized: the first eighth note on the first down beat of the first scale in the sequence of scales making up the exercise is legato; for the remainder of the exercise, "ands," or up beats, are slurred to the downbeats.
- Chord symbols are used in the final set of exercises to inform the user which key area the scale should stem from.

This method takes a systematic approach. It completely explores the possibilities of harmonic motion of a particular type of chord, in this case, major chords. In each exercise, the harmonic motion is dictated by a specific interval. Using major chords and intervals in the manner of the method, one can explore all possibilities. The techniques described above for major chords may also be applied to other chord qualities (such as minor, augmented, diminished, and half-diminished) and other scales (such as minor, octotonic, whole-tone, be-bop dominant, be-bop major, pentatonic, and so forth. The techniques may also be applied to musical structures other than scales, including, but not limited to arpeggios, intervals, melodic phrases, formulas, "licks" or "riffs," duets, songs, play along recordings, etc . . . The techniques thus represent the beginning of a thorough and systematic approach to providing the technical foundations for jazz improvisation. The techniques are particularly adapted to helping classically trained musicians cross over into the jazz idiom.

Recordings Used as Instructional Aids with the Method

Jazz melodies are played with a rhythmic accompaniment of chords. The accompanying musicians select their chords from a set of chords which sound "good" with the notes of the scale for the key of the melody. In jazz, the set of chords belongs to what is termed the ii V I chord progression. In the notation used to specify the chord progression, each interval of the scale is assigned a Roman number, beginning with I for first and ending with VII for the seventh. If the chord based on the interval is a major chord, the roman number is capitalized; if the chord is a minor chord, the roman number is not capitalized. When this notation is used to describe the chords of a major key, the I and IV chords are major, the ii, iii, and vi chords are minor, the V is dominant, and the vii is half-diminished. Thus, for the key area of C major, the ii V I chord progression, the ii chord is a D-minor chord, the V chord is a G dominant, and the I chord is C major. When a jazz musician is accompanying a melody in C major, he or she will tend to employ chords from the ii V I progression for that key area. Because these chords can be substituted for each other, the set of chords belonging to the ii V I progression are termed chord substitutions for the ii V I chord progression of the C major key area. Other chord progressions for the C major key area similarly define chord substitutions, as do chord progressions for other key areas.

A compact disc is provided with the method to give the player training in playing with a rhythmic accompaniment that provides chords from the chord substitutions for the key area of an exercise of the method. Each compact disc will contain several recordings. On these recordings one will hear a jazz rhythm section comprised of drum set, bass, and piano and/or guitar. The rhythm section may or may not be joined by one or more melodic instruments. The rhythm section may or may not be synthesized. The recording of the rhythm section for a particular exercise may include versions that are played at different tempos, for example, slow, medium, and fast.

Most important, however, is that this rhythm section performs chords which accompany the final set of exercises of the type shown in FIG. 7. The chords which accompany each key area in the sequence of key areas specified for the exercises are taken from the chords belonging to the chord substitution for the key area. In addition to using the accompaniment to practice the exercises of the method, the player can also use it as a framework for his or her own solos or ensemble work with other melodic instruments.

CONCLUSION

In the foregoing Detailed Description, the inventor has shown those skilled in the arts of musical performance how to make and use his exercises and has also disclosed the best mode presently known to the inventor of making the exercises. As is pointed out in the Detailed Description, however, many variations are possible. The sequences of patterns may be included with other material in an exercise, patterns other than scales may be employed, key areas other than the major key areas may be employed, and intervals other than those disclosed herein may be employed. In a preferred embodiment, the exercises are for solo melodic instrument with a possible recorded accompaniment, but versions may be made for solo voice or for ensembles, with the accompaniment being provided by part of the ensemble and the patterns being made for one or more melodic instruments or voice. By following the principles of the invention, a recorded accompaniment may be made for any sequence of patterns. For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

The invention claimed is:

1. A method of gaining facility in playing a musical instrument, the method comprising the steps of:
in an exercise that includes a sequence of patterns, each pattern in the sequence immediately preceding and/or following another pattern in the sequence,
playing a pattern in the sequence of patterns on the musical instrument, each pattern in the sequence of patterns being made up of one or more octave scales and each octave scale being made up of notes of equal duration; and
playing the immediately following pattern in the sequence of patterns on the musical instrument, the immediately following pattern beginning at an interval from the beginning of the immediately preceding pattern in the sequence of patterns that is the same throughout the sequence of patterns.

2. The method set forth in claim 1 wherein;
the octave scale is performed in a single measure of four four time.

3. The method set forth in claim 1 wherein:
the interval is selected from intervals ranging from a half step through a tri tone.

4. The method set forth in claim 1 wherein:
the sequence of patterns spans a predetermined range; and
the first pattern of the sequence of patterns is at one end of the range and the patterns of the sequence of patterns extend to the other end of the range and back to the one end of the range.

5. The method set forth in claim 1 wherein:
the patterns in the sequence of patterns are played on the instrument with perpetual motion between the patterns.

6. The method set forth in claim 1 wherein:
playing each pattern with an articulation, the articulation being identical to the articulation in each of the other patterns.

7. The method set forth in claim 6 wherein:
in the articulation the first note of each octave is played on a downbeat, the following notes of the pattern are played alternatively on an upbeat and the downbeat, and the notes of the pattern that are played on the upbeat are slurred to the notes of the pattern that are played on the downbeat.

8. The method set forth in claim 7 wherein:
in the articulation the first note of the first pattern in the sequence of patterns is further performed legato.

9. The method set forth in claim 7 wherein:
in the articulation the last note of each pattern in the sequence of patterns is further slurred to the first note of the immediately following pattern in the sequence of patterns.

10. The method set forth in claim 9 wherein:
the octave scale is performed in a single measure of four four time.

11. The method set forth in claim 1 wherein:
the pattern extends over two octaves.

12. The method set forth in claim 1 wherein:
the sequence of patterns is played in a plurality of keys and the patterns in the sequence of patterns for each key of the plurality are drawn from the major scale for the key and modes that stem from the major scale.

13. The method set forth in claim 1 wherein:
each pattern in the sequence of patterns is played in a key belonging to a sequence formed from a plurality of the keys, each key in the sequence of keys having a fundamental which is different from the fundamental of the previous key in the sequence of keys by an interval that is the same throughout the sequence of keys.

14. The method set forth in claim 13 wherein:
the interval between the fundamentals of the keys is selected from intervals ranging from a half tone through a tri tone.

15. The method set forth in claim 1 wherein:
there is a plurality of kinds of the patterns.

16. The method set forth in claim 15 wherein:
the plurality of kinds includes a pattern of ascending octaves.

17. The method set forth in claim 15 wherein:
the plurality kinds includes a pattern of descending octaves.

18. The method set forth in claim 15 wherein:
the plurality of the kinds includes a pattern that includes both ascending and descending octaves.

19. The method set forth in claim 18 wherein:
the ascending and descending octaves of the pattern are different by an interval that is half the size of the interval between the patterns.

20. The method set forth in claim 19 wherein:
the pattern that includes both ascending and descending octaves is an ascending octave followed by a descending octave.

21. The method set forth in claim 19 wherein:
the pattern that includes both ascending and descending octaves is a descending octave followed by an ascending octave.

22. A method of gaining facility in playing a musical instrument,
the method comprising the steps of:
in an exercise that includes a sequence of patterns, each pattern in the sequence immediately preceding and/or following another pattern in the sequence,
playing a pattern in the sequence of patterns on the musical instrument; and
playing the immediately following pattern in the sequence of patterns on the musical instrument, the immediately following pattern beginning at an interval from the beginning of the immediately preceding pattern in the sequence of patterns that is the same throughout the sequence of patterns, the patterns in the sequence of patterns being played with perpetual motion between the patterns.

23. A human-readable copy of an exercise for gaining facility in playing a musical instrument, the human-readable copy being characterized in that:
the exercise includes a sequence of patterns, each pattern in the sequence of patterns immediately preceding and/or following another pattern in the sequence of patterns and a player of the of the exercise on the musical instrument performs the steps of
playing a pattern in the sequence of patterns on the musical instrument, each pattern in the sequence of patterns being made up of one or more octave scales and each octave scale being made up of notes of equal duration; and
playing the immediately following pattern in the sequence of patterns on the musical instrument, the immediately following pattern beginning at an interval from the beginning of the immediately preceding pattern in the sequence of patterns that is the same throughout the sequence of patterns.

* * * * *